(12) United States Patent
Etscheid et al.

(10) Patent No.: US 10,657,210 B2
(45) Date of Patent: May 19, 2020

(54) SLACK TIME RECYCLING

(71) Applicant: Mentor Graphics Corporation, Wilsonville, OR (US)

(72) Inventors: Brian Etscheid, Redwood City, CA (US); Terry Goode, Sunnyvale, CA (US); Spencer Saunders, Bedfordshire (GB)

(73) Assignee: Mentor Graphics Corporation, Wilsonville, OR (US)

( * ) Notice: Subject to any disclaimer, the term of this patent is extended or adjusted under 35 U.S.C. 154(b) by 193 days.

(21) Appl. No.: 15/872,253

(22) Filed: Jan. 16, 2018

(65) Prior Publication Data

US 2019/0220565 A1 Jul. 18, 2019

(51) Int. Cl.
*G06F 17/50* (2006.01)
*G06F 1/08* (2006.01)
*G06F 15/80* (2006.01)

(52) U.S. Cl.
CPC ............ *G06F 17/5045* (2013.01); *G06F 1/08* (2013.01); *G06F 17/5027* (2013.01); *G06F 15/80* (2013.01); *G06F 2217/02* (2013.01); *G06F 2217/04* (2013.01); *G06F 2217/06* (2013.01); *G06F 2217/84* (2013.01)

(58) Field of Classification Search
USPC ........................................................ 716/102
See application file for complete search history.

(56) References Cited

U.S. PATENT DOCUMENTS

| | | | | |
|---|---|---|---|---|
| 7,478,356 B1 * | 1/2009 | Sundararajan | ...... | G06F 17/5054 716/138 |
| 8,448,105 B2 * | 5/2013 | Dimou | ................ | G06F 17/5059 716/103 |
| 2004/0250231 A1 * | 12/2004 | Killian | ................ | G06F 17/5045 716/102 |
| 2009/0217232 A1 * | 8/2009 | Beerel | ................ | G06F 17/5059 716/104 |
| 2013/0111425 A1 * | 5/2013 | Kumar | ................ | G06F 17/505 716/104 |

* cited by examiner

*Primary Examiner* — Mohammed Alam
(74) *Attorney, Agent, or Firm* — Mentor Graphics Corporation

(57) ABSTRACT

This application discloses a computing system to identify a stage of a logic pipeline described in a circuit design that, when implemented in configurable hardware, spans between partitions in the configurable hardware. The computing system can modify the circuit design to alter a timing for logic operations in the logic pipeline, which reduces slack in at least one stage in the logic pipeline adjacent to the identified stage in the logic pipeline. The computing system can utilize the slack reduced from at least one of the stages adjacent to the identified stage to increase a clock frequency in the configurable hardware or increase a time available for propagation delay associated with the identified stage. The computing system can generate a configuration for the configurable hardware that implements the logic pipeline with the altered timing in the configurable hardware.

20 Claims, 9 Drawing Sheets

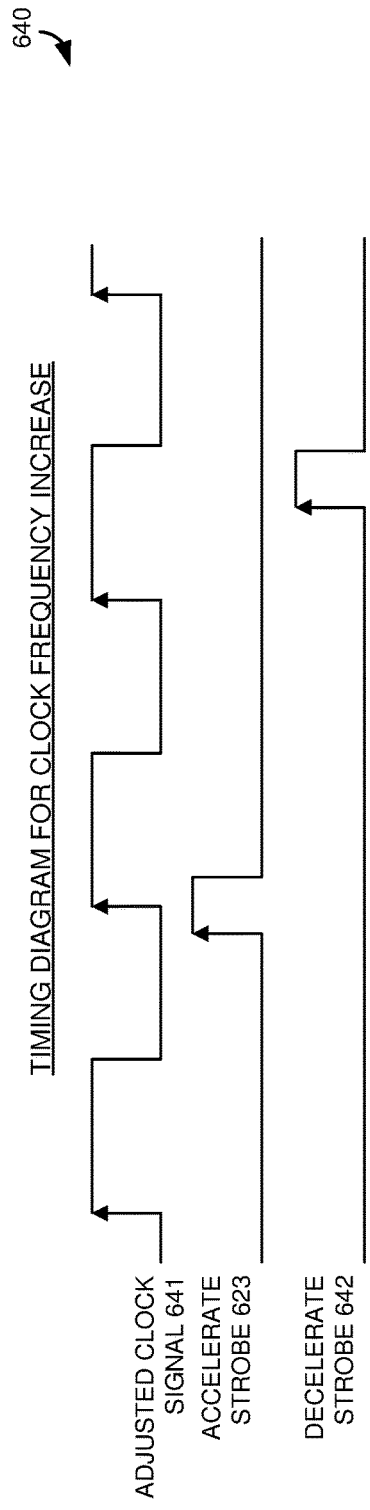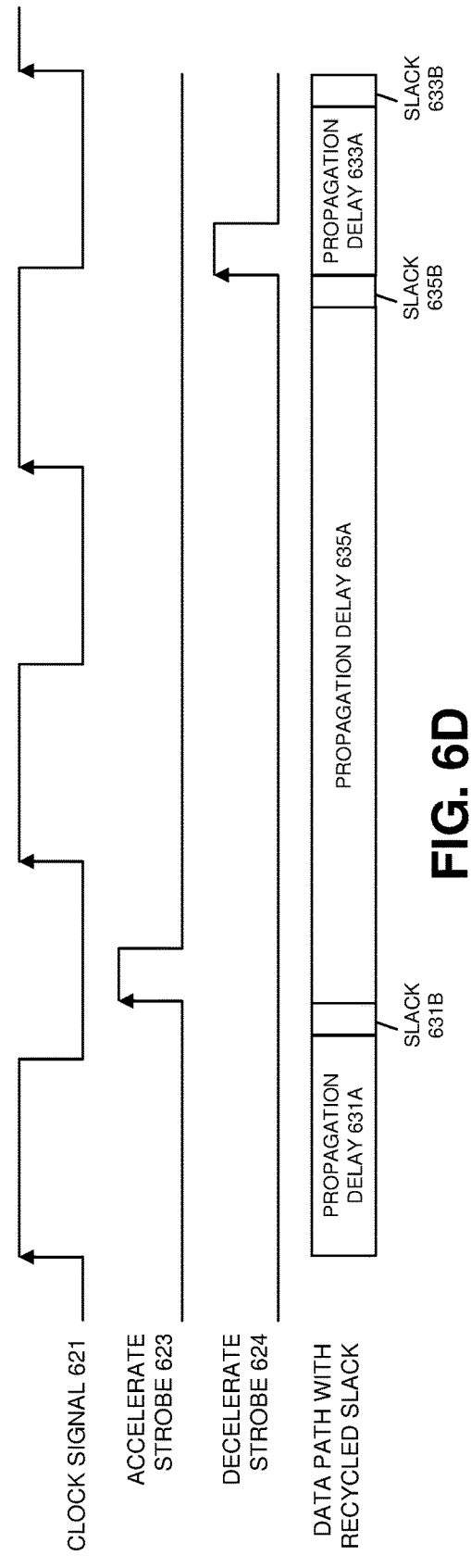
FIG. 6C
FIG. 6D

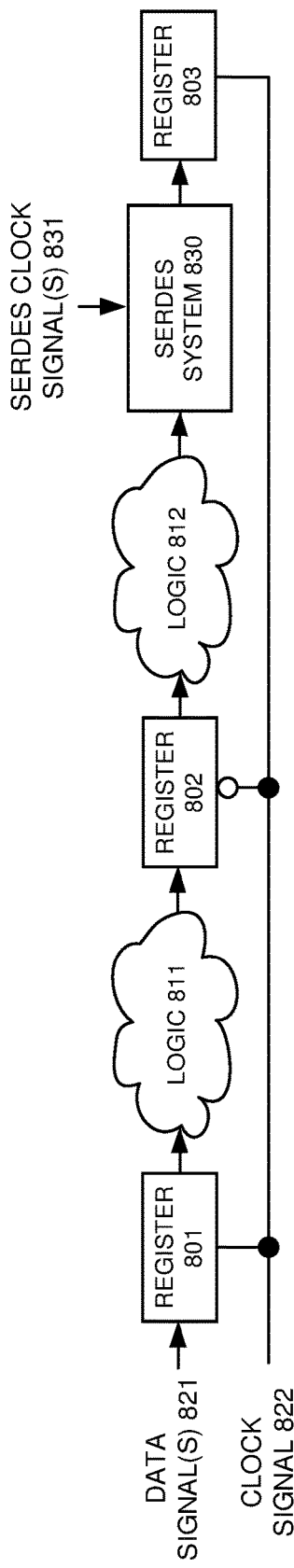
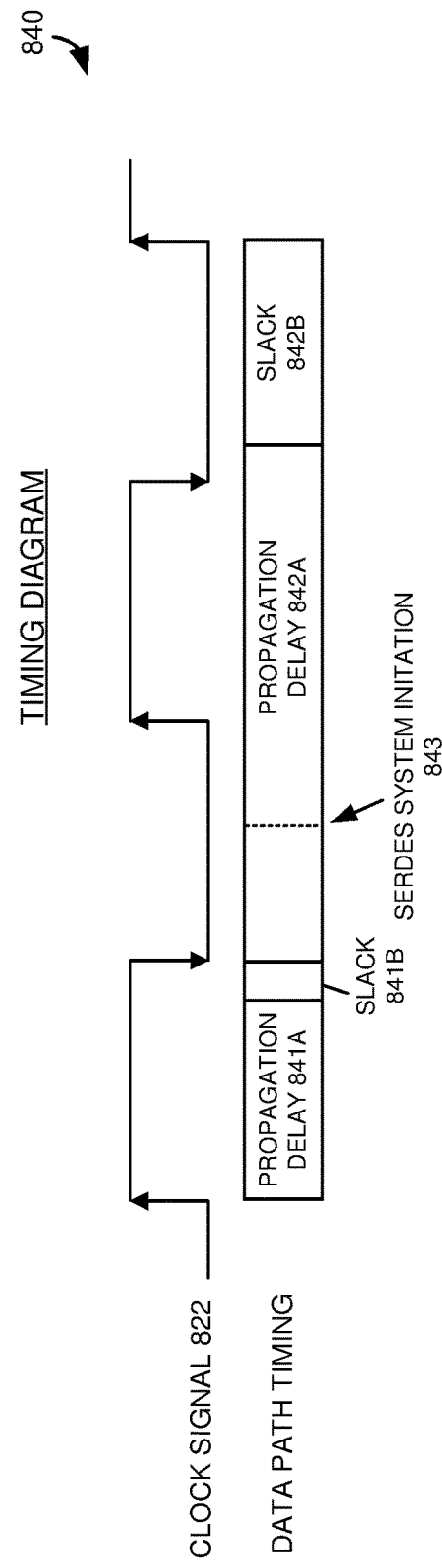
FIG. 8A
FIG. 8B

SLACK TIME RECYCLING

TECHNICAL FIELD

This application is generally related to electronic design automation and, more specifically, to slack time recycling for electronic design verification.

BACKGROUND

Designing and fabricating electronic systems typically involves many steps, known as a "design flow." The design flow typically starts with transforming a specification for a new electronic system into a logical design. The logical design can describe the electronic system in terms of both the exchange of signals, for example, between hardware registers, and the logical operations that can be performed on those signals. In some examples, the logical design can model the electronic system at a register transfer level (RTL) level of design abstraction using a Hardware Description Language (HDL), such as SystemVerilog, Very high speed integrated circuit Hardware Description Language (VHDL), or the like.

The design flow can include "functional verification" of the logical design, for example, determining whether the logical design accurately performs intended functions of the electronic system. Typically, software and hardware "tools" can perform functional verification operations, such as simulating, emulating, prototyping, and/or formally verifying the logical design. For example, a computing system implementing a design verification tool can simulate functionality described in the logical design and provide transactions or sets of test vectors to the simulated logical design. The computing system implementing the design verification tool can determine whether the logical design describes circuitry configured to accurately perform the intended functions of the electronic system based on how the simulated logical design responded to the transactions or test vectors.

Emulation and prototyping systems can include programmable logic devices, such as field-programmable gate arrays (FPGAs), which include integrated circuitry capable of being configured to implement the electronic system described in the logical design. The logical design can be synthesized from the register transfer level into a gate-level representation, such as a netlist, and then compiled into a format capable of configuring the programmable logic devices in the emulation and prototyping systems to implement the electronic system described in the logical design. In some examples, the synthesis operations can include RTL synthesis, which can generate generic gates corresponding to the functionality described in the logical design, and include physical synthesis or compilation, which can map the generic gates to one or more target programmable logic devices, for example, generating a target device-specific netlist. The emulation and prototyping systems can be configured with the target device-specific netlist to implement the electronic system associated with the logical design.

The emulation and prototyping systems may include hardware-based features that, when utilized to implement the logic design, would introduce delay between registers or other clock-driven circuitry. Some of these hardware-based features can introduce signal propagation delays, for example, due to transitions between different programmable logic devices, between different printed circuit boards, between different chassis, between different sub-sections of logic on a programmable logic device, or the like. The hardware-based features also can introduce signal translation delays, such as through power domain crossings, time-domain multiplexing delay, Serializer/Deserializer (SERDES) delay, or the like. The addition of the delay introduced by these hardware-based features can increase a worst case delay between registers or other clock-driven circuitry implemented in the emulation and prototyping systems, which can result in the emulation and prototyping systems reducing the frequency of a system clock to accommodate the worst case delay and thus slowing operation of the emulation and prototyping systems.

Some emulation and prototyping systems attempt to offset a portion of this system speed reduction by altering the synthesis of the logical design, for example, by selecting which portions of the logical design should include the delays due to the signal transitions and signal translations. While a thoughtful configuration of the emulation and prototyping systems with the logical design may reduce an impact the additional delay has on overall system speed, it typically comes at a cost of increased compilation time or synthesis time due to the added complexity in design constraints.

SUMMARY

This application discloses a computing system implementing a verification configuration tool to convert a circuit design describing an electronic device having a logic pipeline into a configuration for configurable hardware in a verification system. When the configurable hardware is set according to the configuration, the verification system can implement the electronic device described by the circuit design.

According to various embodiments, the computing system implementing the verification configuration tool can identify a stage of the logic pipeline described in the circuit design that, when implemented by the configurable hardware, spans between partitions in the verification system. The computing system can modify the circuit design to alter timing for logic operations in the logic pipeline, which reduces slack in at least one stage in the logic pipeline adjacent to the identified stage in the logic pipeline. The computing system can recycle the slack recovered from at least one of the stages adjacent to the identified stage, for example, to increase a clock frequency in the verification system or increase a time available for propagation delay associated with the identified stage. The computing system can generate the configuration for the configurable hardware that implements the logic pipeline with the altered timing in the verification system. Embodiments will be described in greater detail below.

DESCRIPTION OF THE DRAWINGS

FIGS. 6A-6D illustrate an example logic pipeline with strobes and associated timing diagrams with recovered slack and recycled slack that may be implemented according to various embodiments.

FIGS. 8A and 8B illustrate an example dual edge activation for a logic pipeline with a serializer/deserializer (SERDES) system and associated timing diagram that may be implemented according to various embodiments.

DETAILED DESCRIPTION

Illustrative Operating Environment

Figure 1:
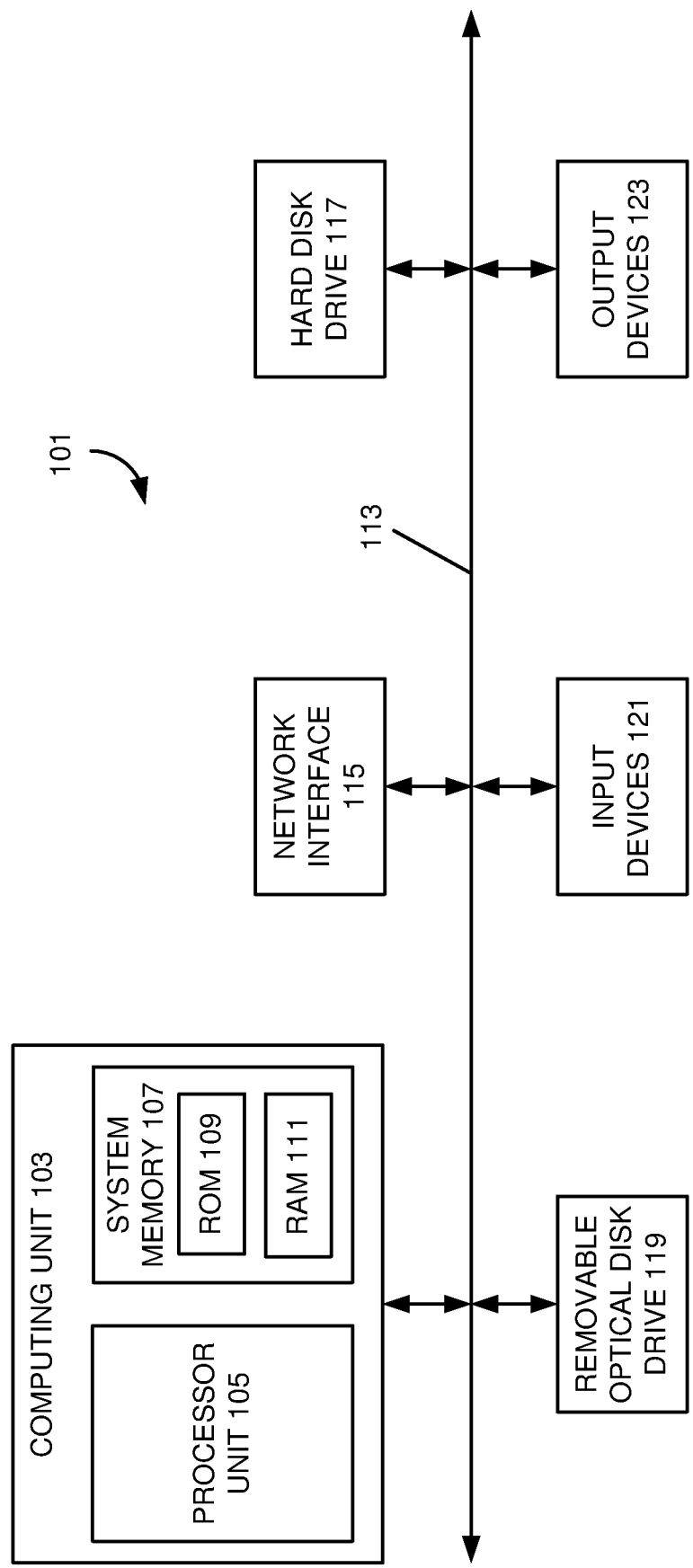
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
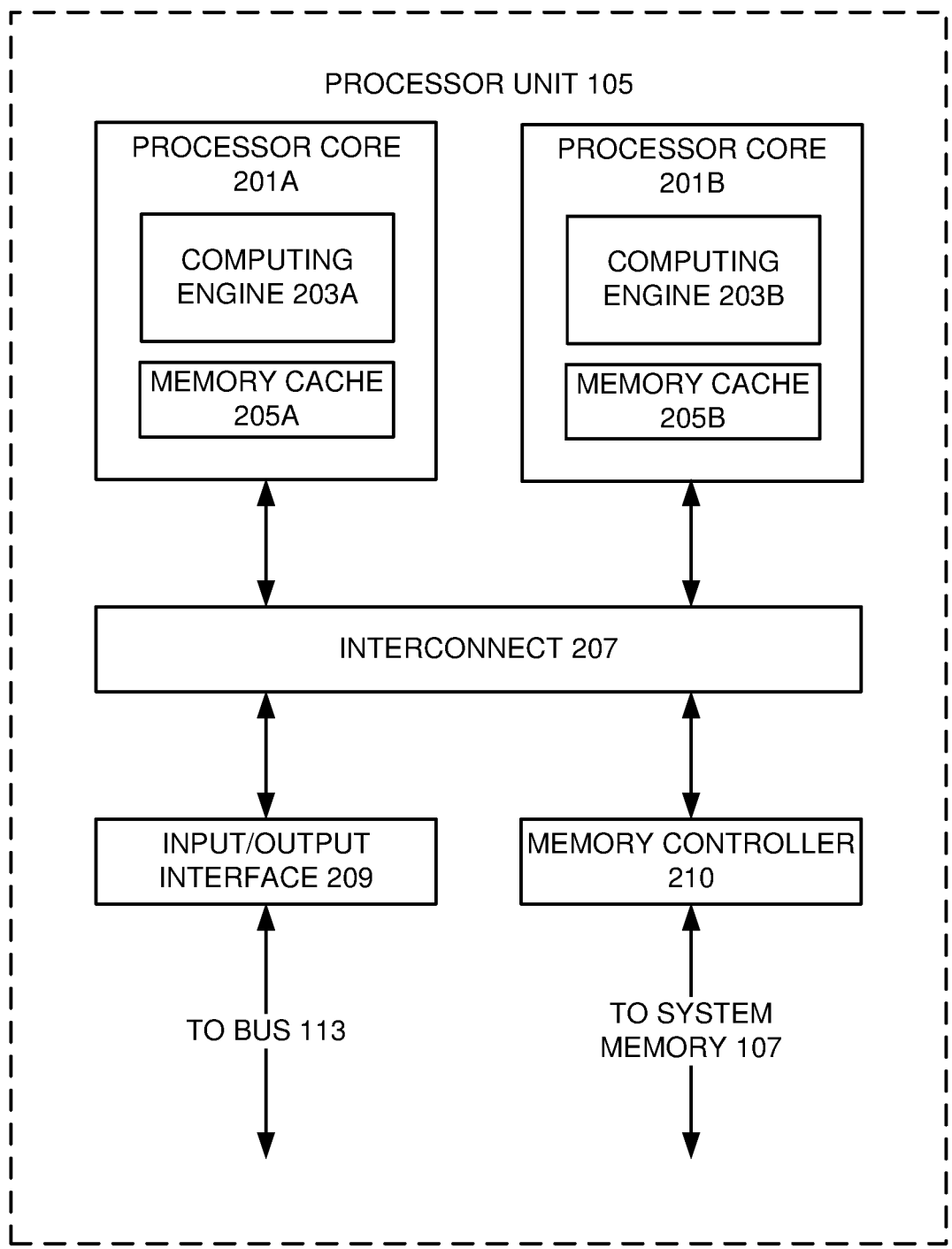

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Slack Time Recycling

Figure 3:
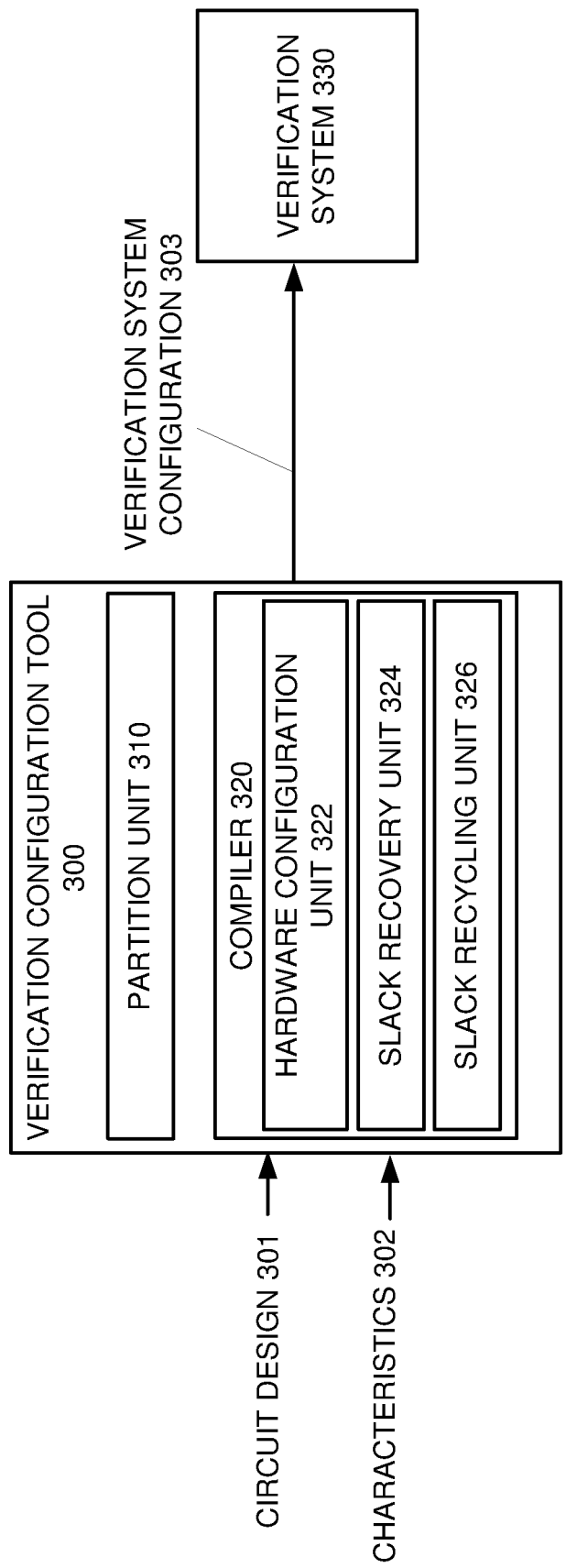
FIG. 3 illustrates an example of verification configuration tool according to various embodiments.

FIG. 3 illustrates an example of verification configuration tool 300 according to various embodiments. Referring to FIG. 3, the verification configuration tool 300 can receive a circuit design 301, which can describe an electronic device both in terms of an exchange of data signals between components in the electronic device, such as hardware registers, flip-flops, combinational logic, clock-driven circuitry, or the like, and in terms of logical operations that can be performed on the data signals in the electronic device. The circuit design 301 can model the electronic device at a register transfer level (RTL), for example, with code in a hardware description language (HDL), such as System Verilog, Very high speed integrated circuit Hardware Design Language (VHDL), System C, or the like. In some embodiments, the verification configuration tool 300 can receive the circuit design 301 from a source external to the verification configuration tool 300, such as a user interface of the computer network 101, another tool implemented by the computer network 101, or the verification configuration tool 300 may generate the circuit design 301 internally.

The verification configuration tool 300 also can receive characteristics 302 for a verification system 330 having configurable hardware, such as a prototyping system, an emulation system, or other system capable of implementing the electronic device described the circuit design 301 with configurable hardware devices. The configurable hardware devices can have field programmable gate array (FPGA) architectures, application specific integrated circuit (ASIC) architectures, system-on-a-chip (SOC) architectures, a combination thereof, or the like.

The characteristics 302 can identify physical specifications of the verification system 330, such as a number of configurable hardware devices in the verification system 330, capacities of the configurable hardware devices, hardware partitions in the verification system 330, e.g., between configurable hardware devices, printed circuit boards, chassis, sub-systems in a configurable hardware device, or the like, physical distances between partitions, data translation between the partitions, power domain crossings across partitions, a serializer/deserializer (SERDES) interface between partitions, or the like. A partition in the verification system 330 can describe a portion of configurable hardware configurable to implement a collection of logic.

The verification configuration tool 300 can convert the circuit design 301 into a verification system configuration 303 based, at least in part, on the characteristics 302. The verification system configuration 303, when downloaded to the verification system 330, can cause at least one programmable logic device in the verification system 330 to implement the electronic device described in the circuit design 301. In some embodiments, the verification system 330 can be configured with the verification system configuration 303 to implement a logic pipeline having multiple stages configured to perform logic operations in response to a clock signal. Embodiments of a logic pipeline and associated timing diagram are shown in FIGS. 4A and 4B.

Figure 4A:
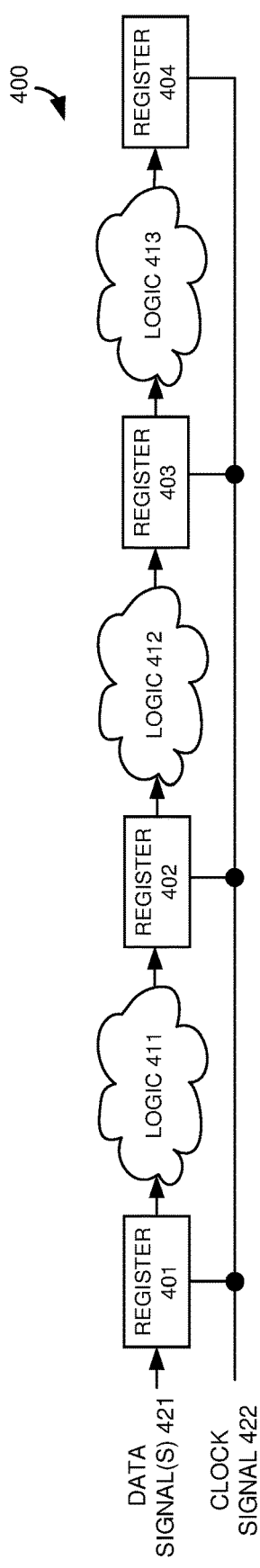
FIGS. 4A and 4B illustrate an example logic pipeline and associated timing diagram that may be implemented by a verification system according to various embodiments.
Figure 4B:
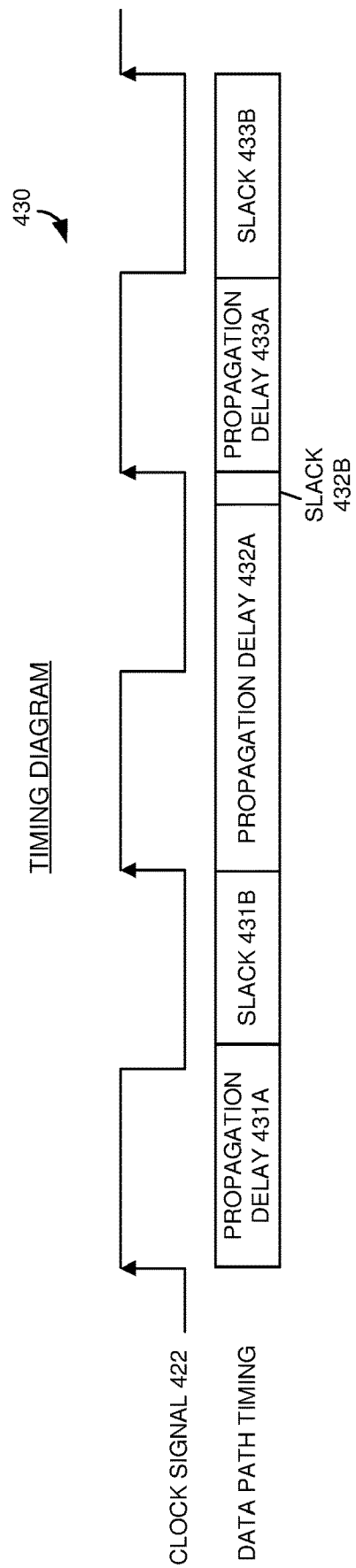

FIGS. 4A and 4B illustrate an example logic pipeline 400 and associated timing diagram 430 that may be implemented by a verification system, such as verification system 330 in FIG. 3, according to various embodiments. Referring to FIGS. 4A and 4B, the logic pipeline 400 includes multiple stages, each having combinational logic, such as logic 411-413, coupled between clock-driven circuitry, such as registers 401-404. In a first stage of the logic pipeline 400, the register 401 can be configured to latch data signals 421 in response to a rising edge of the clock signal 422 and allow the data signals 421 to propagate through the logic 411 to the register 402. On the next rising edge of the clock signal 422, the register 402 can latch data signals received from the logic 411. The data path timing for the propagation of the data signals 421 to through the logic 411 to the register 402 includes a propagation delay 431A and slack 431B. The propagation delay 431A corresponds to a time for the data signals 421 to traverse through the logic 411 and arrive at the register 402. The slack 431B corresponds to a difference between a time available for the data signals 421 to arrive at the register 402 and the propagation delay 431A for the data signals 421.

In a second stage of the logic pipeline 400, the register 402 can be configured to latch data signals 421 from the logic 411 in response to a rising edge of the clock signal 422 and allow the latched data signals to propagate through the logic 412 to the register 403. On the next rising edge of the clock signal 422, the register 403 can latch data signals received from the logic 412. The data path timing for the propagation of the latched data signals to through the logic 412 to the register 403 includes a propagation delay 432A and slack 432B. The propagation delay 432A corresponds to a time for the data signals to traverse through the logic 412 and arrive at the register 403. The slack 432B corresponds to a difference between a time available for the data signals to arrive at the register 403 and the propagation delay 432A for the data signals.

In a third stage of the logic pipeline 400, the register 403 can be configured to latch data signals from the logic 412 in response to a rising edge of the clock signal 422 and allow the latched data signals to propagate through the logic 413 to the register 404. On the next rising edge of the clock signal 422, the register 404 can latch data signals received from the logic 413. The data path timing for the propagation of the latched data signals to through the logic 413 to the register 404 includes a propagation delay 433A and slack 433B. The propagation delay 433A corresponds to a time for the data signals to traverse through the logic 413 and arrive at the register 404. The slack 433B corresponds to a difference between a time available for the data signals to arrive at the register 404 and the propagation delay 433A for the data signals.

In some embodiments, the frequency of the clock signal 422 can be set based, at least in part, on a delay through at least one of the stages in the logic pipeline 400. For example, when the second stage of the logic pipeline 400 has the longest delay of any stage in the logic pipeline 400, the frequency of the clock signal 422 can be set to give a clock period long enough to accommodate the delay in the second stage of the logic pipeline 400.

Referring back to FIG. 3, the verification configuration tool 300 can include a partition unit 310 to identify partitions in configurable hardware within the verification system 330 based, at least in part, on the characteristics 302. Each partition in the configurable hardware can identify a different collection or set of logic within the verification system 330 capable of being configured, for example, with the verification system configuration 303. In some embodiments, the partitions in the verification system 330 may be based on physical features in the configurable hardware, such as different configurable hardware devices in the verification system 330, different printed circuit boards in the verification system 330, different chassis in the verification system 330, or the like. The partitions in the verification system 330 may be based on virtual features in the configurable hardware, such as transitions between sub-systems in a configurable hardware device, or the like.

In some embodiments, the partition unit 310 can identify the partitions in the verification system 330 based on a presence of interfaces between portions of configurable hardware in the verification system 330. The partition unit 310, based on the characteristics 302, can locate interfaces in the verification system 330, such as power domain crossings, serializer/deserializer (SERDES) interfaces, data translation interfaces, or other hardware-based feature that can introduce data propagation delay between different portions of the verification system 330. In some embodiments, the partition unit 310 can identify the partitions in the verification system 330 based on a presence of interfaces between portions of configurable hardware in the verification system 330. The partition unit 310 can determine the portions of the verification system 330 on either side of an identified interface as corresponding to different partitions in the verification system 330.

The verification configuration tool 300 can include a compiler 320 to convert the circuit design 301 into the verification system configuration 303 based, at least in part, on the identified partitions in the verification system 330. In some embodiments, the compiler 320 can include a hardware configuration unit 322 to synthesize the circuit design 301 from the register transfer level into a gate-level representation, such as a netlist, and then compile into a format capable of configuring the programmable logic devices in the verification system 330. For example, the hardware configuration unit 322 can perform the synthesis operations by generating generic gates corresponding to the functionality described in the circuit design 301 and then map the generic gates to one or more target programmable logic devices in the verification system 330, for example, generating a target device-specific netlist, which can be verification system configuration 303. In some embodiments, the circuit design 301 may be received by the verification tool 300 already synthesized into a netlist.

The compiler 320 can include a slack recovery unit 324 to determine which transitions between the partitions in the verification system 330 can introduce data propagation delay in the verification system 330. For example, the compiler 320 can recognize that when the verification system 330—as configured with the verification system configuration 303—would implement a logic pipeline spanning across multiple partitions in the verification system 330. When the logic pipeline spans across multiple partitions in the verification system 330, the logic pipeline can have a pipeline delay mismatch, for example, the stages of the logic pipeline can have different data propagation delays and thus different slacks.

In some embodiments, the slack recovery unit 324 can identify a stage in the logic pipeline having a stage spanning across multiple partitions in the verification system 330, and alter the timing of the logic pipeline to reduce slack in at least one stage in the logic pipeline adjacent to the identified stage in the logic pipeline. For example, the slack recovery unit 324 can replace or alter a clock signal initiating logic operations in the identified stage of the logic pipeline, for example, having the identified stage initiate logic operations earlier, which can reduce a slack in a previous stage in the logic pipeline. In some examples, the slack recovery unit 324 can replace or alter a clock signal initiating logic operations in a stage subsequent to the identified stage of the logic pipeline, for example, having the subsequent stage initiate logic operation later, which can reduce a slack in the subsequent stage in the logic pipeline. Embodiments of a logic pipeline with altered timing and associated timing diagrams are shown below in FIGS. 6A-6D.

The compiler 320 can include a slack recycling unit 326 to utilize the slack recovered by the slack recovery unit 324 in the generation of the verification system configuration 303. In some embodiments, the slack recycling unit 326 can utilize the recovered slack to generate the verification system configuration 303 with an increased clock frequency. The verification system 330 when configured with the verification system configuration 303 can operate with the clock frequency set by the slack recycling unit 326. The operation of the verification system 330 at the increased clock frequency can allow the verification system 330 implementing the verification system configuration 303 to increase throughput for functional verification of the circuit design 301 in the verification system 330, which can reduce design-time for the electronic device. Embodiments of the recycling slack for use in increasing clock frequency will be described below with reference to FIG. 6C.

The slack recycling unit 326 also can utilize the recovered slack to increase a time available in the identified stage in the logic pipeline to perform logic operations. This increase in available time for logic operations in the identified stage can provide the compiler 320 increased flexibility to meet the design constraints associated with compiling the circuit design 301 into the verification system configuration 303. The compiler 320, in some embodiments, can utilize the increased flexibility to more quickly generate the verification system configuration 303 from the circuit design 301, for example, allowing the compiler 320 the ability to shift logic into the identified stage to help meet timing requirements for the implementation of the verification system configuration 303 in the verification system 330. Embodiments of the recycling slack to gain flexibility in meeting design constraints will be described below with reference to FIG. 6D.

In some embodiments, the slack recycling unit 326 also can utilize the increase in time available in the identified stage to initiate utilization of a data translation interface, such as a SERDES interface, earlier in the logic pipeline and, possibly, for a longer time. Since a SERDES interface can become a bottleneck in a logic pipeline, for example, when having to time-division-multiplex 1000's of signals into 100's of time slots across the SERDES interface, increasing a time available for utilization of the SERDES interface can allow the compiler 320 to meet the design constraints associated with compiling the circuit design 301 into the verification system configuration 303. Embodiments of the recycling slack to gain flexibility in a SERDES pipeline will be described below with reference to FIGS. 7A, 7B, 8A, and 8D.

Figure 5:
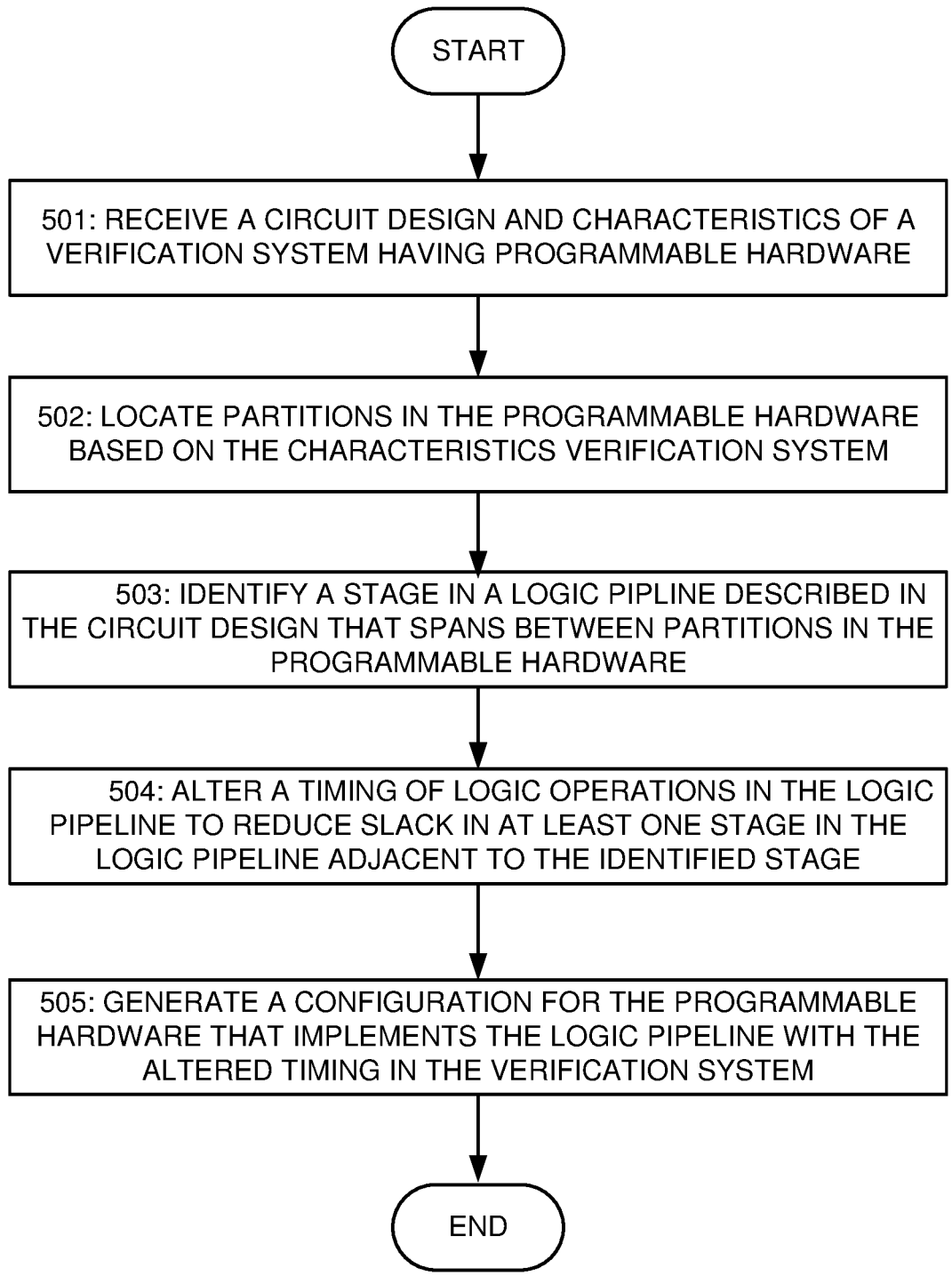
FIG. 5 illustrates a flowchart showing example slack recovery in a logic pipeline with one or more strobes according to various examples.

FIG. 5 illustrates a flowchart showing example slack recovery in a logic pipeline with one or more strobes according to various examples. Referring to FIG. 5, in a block 501, a computing system implementing a verification configuration tool can receive a circuit design and characteristics of a verification system having configurable hardware. The circuit design can describe an electronic device both in terms of an exchange of data signals between components in the electronic device, such as hardware registers, flip-flops, combinational logic, clock-driven circuitry, or the like, and in terms of logical operations that can be performed on the data signals in the electronic device. The circuit design can model the electronic device at a register transfer level (RTL), for example, with code in a hardware description language (HDL), such as System Verilog, Very high speed integrated circuit Hardware Design Language (VHDL), System C, or the like.

The characteristics for a verification system can identify physical specifications of the verification system, such as a number of configurable hardware devices in the verification system, capacities of the configurable hardware devices, hardware partitions in the verification system, e.g., between configurable hardware devices, printed circuit boards, chassis, sub-systems in a configurable hardware device, or the like, physical distances between partitions, data translation between the partitions, power domain crossings across partitions, a serializer/deserializer (SERDES) interface between partitions, or the like. A partition in the verification system can describe a portion of configurable hardware configurable to implement a collection of logic.

In a block 502, the computing system implementing the verification configuration tool can locate partitions in the configurable hardware based on the characteristics verification system. Each partition in the configurable hardware can identify a different collection or set of logic within the verification system capable of being configured, for example, with the verification system configuration. In some embodiments, the partitions in the verification system may be based on physical features in the configurable hardware, such as different programmable logic devices in the verification system, different printed circuit boards in the verification system, different chassis in the verification system, or the like. The partitions in the verification system may be based on virtual features in the configurable hardware, such as transitions between sub-systems in a programmable logic device, or the like.

In some embodiments, the verification configuration tool can identify the partitions in the verification system based on a presence of interfaces between portions of configurable hardware in the verification system. The verification configuration tool can, based on the characteristics, can locate interfaces in the verification system, such as power domain crossings, serializer/deserializer (SERDES) interfaces, data translation interfaces, or other hardware-based feature that can introduce data propagation delay between different portions of the verification system. The verification configuration tool can identify the partitions in the verification system based on a presence of interfaces between portions of configurable hardware in the verification system. The verification configuration tool can determine the portions of the verification system on either side of an identified interface as corresponding to different partitions in the verification system.

In a block 503, the computing system implementing the verification configuration tool can identify a stage in a logic pipeline described in the circuit design would span between partitions in the configurable hardware. In some embodiments, the computing system implementing the verification configuration tool can select a stage in the logic pipeline to span across multiple partitions in the configurable hardware based, at least in part, on an availability of recoverable slack in adjacent stages of the logic pipeline and an expected data propagation delay associated with the spanning across the partitions. The computing system implementing the verification configuration tool also can determine where a configuration of the configurable hardware would implement the logic pipeline from the circuit design, and compare the location of the logic pipeline in the configurable hardware against the identified partitions in the configurable hardware. When the logic pipeline is to be implemented with multiple partitions in the configurable hardware, the computing system implementing the verification configuration tool can determine which of the stages in the logic pipeline would span across the partitions in the configurable hardware.

In a block 504, the computing system implementing the verification configuration tool can alter a timing of logic operations in the logic pipeline to reduce slack in at least one stage in the logic pipeline adjacent to the identified stage. In some embodiments, the alteration of the timing in the logic pipeline can include replacing the clock signal to the identified stage with an accelerate strobe, which can reduce slack in a previous stage in the logic pipeline. The accelerate strobe can prompt initiation of logic operations in the identified stage earlier than the replaced clock signal, expanding an available time in the identified stage for data propagation.

The verification configuration tool, in some embodiments, also can alter a timing of logic operations in the logic pipeline by replacing the clock signal to a subsequent stage to the identified state with a decelerate strobe, which can reduce slack in the subsequent stage in the logic pipeline. The decelerate strobe can prompt initiation of logic operations in the subsequent stage later than the replaced clock signal, expanding an available time in the identified stage for data propagation.

The verification configuration tool may alter a timing of logic operations in the logic pipeline by modifying when the clock signal activates the identified stage or the subsequent stage in the logic pipeline. For example, the verification configuration tool can change which clock edge activates the identified stage or the subsequent stage in the logic pipeline. In other examples, the verification configuration tool can modify an arrival time of the clock signal at the identified stage or the subsequent stage in the logic pipeline to reduce slack in one or more of the stages adjacent to the identified stage. The verification configuration tool also can elect to remove clock-activation from one or more of the stages, such as having the initiation of a stage through self-timed activation or through a creation of a multi-cycle path through the logic pipeline.

In a block 505, the computing system implementing the verification configuration tool can generate a configuration for the configurable hardware that implements the logic pipeline with the altered timing in the verification system. The verification configuration tool can convert the circuit design into the configuration for the configurable hardware in the verification system. The configurable hardware, when configured according to the configuration, can implement the logic pipeline with the stage spanning across multiple partitions, which includes a timing alteration to recover slack from at least one adjacent stage for the stage spanning across the partitions.

Figure 6A:
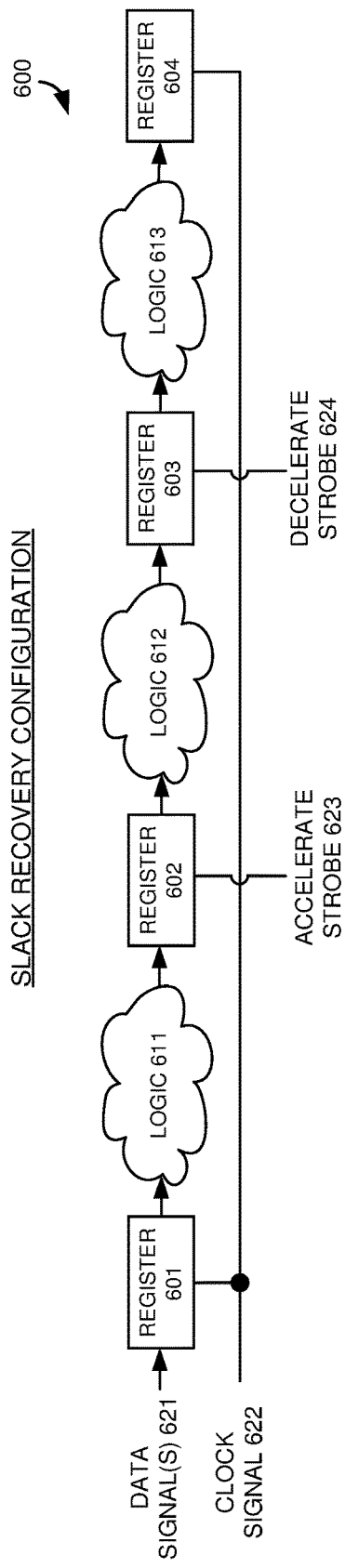
Figure 6B:
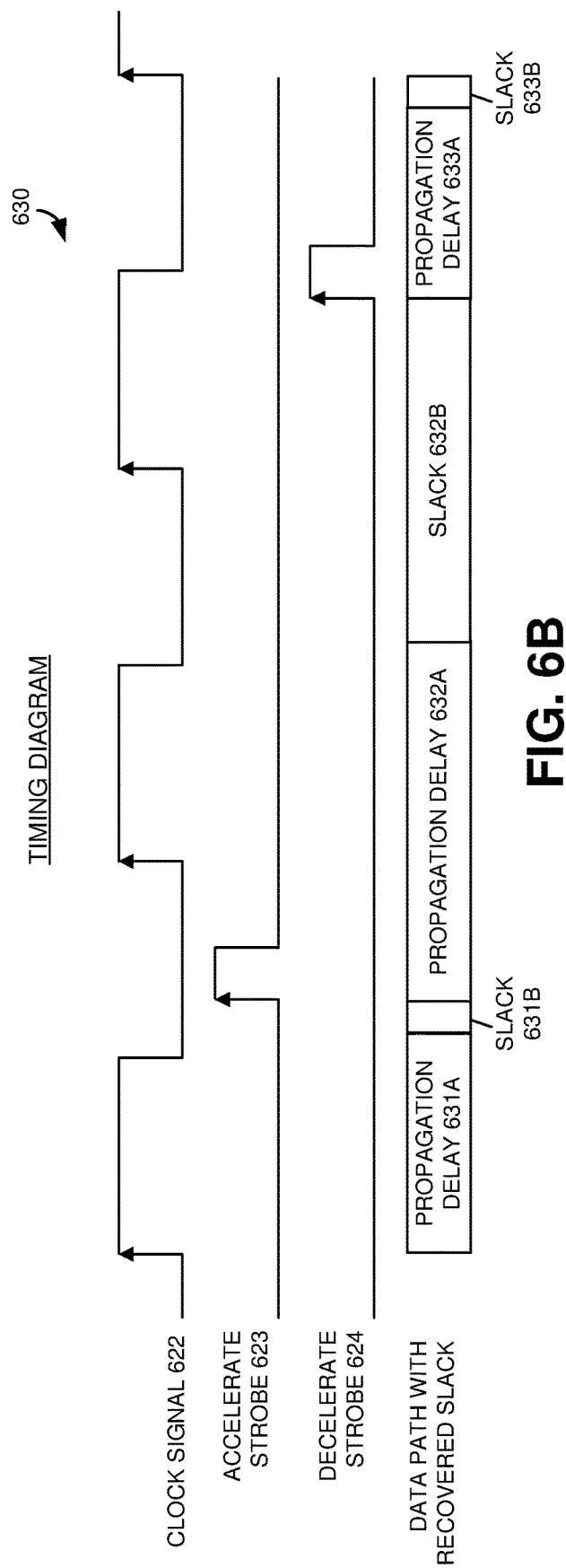

FIGS. 6A-6D illustrate an example logic pipeline 600 with strobes and associated timing diagrams 630-650 with recovered slack and recycled slack that may be implemented according to various embodiments. Referring to FIGS. 6A and 6B, the logic pipeline 600 includes multiple stages, each having combinational logic, such as logic 611-613, coupled between multiple registers 601-604. In a first stage of the logic pipeline 600, the register 601 can be configured to latch data signals 621 in response to a rising edge of the clock signal 622 and allow the data signals 621 to propagate through the logic 611 to the register 602.

The register 602 can receive an accelerate strobe 623 and latch data signals received from the logic 611 in response to the accelerate strobe 623. The accelerate strobe 623 can be a pulsed signal capable of prompting clock-driven logic, such as register 602, to latch data signals for use in a second stage of the logic pipeline 600. The pulsed signal in the accelerate strobe 623 can arrive earlier in time than a second rising edge of the clock signal 622. In some embodiments, the accelerate strobe 623 can be a modified or altered version of the clock signal 622, or the register 602 may be activated by a falling edge, such as a fall edge of the clock signal 622.

The timing diagram 630 shows data path timing for the propagation of the data signals 621 to through the logic 611 to the register 602 includes a propagation delay 631A and slack 631B. The propagation delay 631A corresponds to a time for the data signals 621 to traverse through the logic 611 and arrive at the register 602. The slack 631B corresponds to a difference between a time available for the data signals 621 to arrive at the register 602, e.g., a time between a rising edge of the clock signal 622 and the accelerate strobe 623, and the propagation delay 631A for the data signals 621 through the logic 611.

In the second stage of the logic pipeline 600, the register 602 can be configured to latch data signals from the logic 611 in response to the accelerate strobe 623 and allow the latched data signals to propagate through the logic 612 to the register 603. The register 603 can receive a decelerate strobe 624 and latch data signals received from the logic 612 in response to the decelerate strobe 624. The decelerate strobe 624 can be a pulsed signal capable of prompting clock-driven logic, such as register 603, to latch data signals for use in a third stage of the logic pipeline 600. The pulsed signal in the decelerate strobe 624 can later earlier in time than a third rising edge of the clock signal 622. In some embodiments, the decelerate strobe 624 can be a modified or altered version of the clock signal 622, or the register 603 may be activated by a falling edge, such as a fall edge of the clock signal 622.

The data path timing for the propagation of the latched data signals to through the logic 612 to the register 603 includes a propagation delay 632A and slack 632B. The propagation delay 632A corresponds to a time for the data signals to traverse through the logic 612 and arrive at the register 603. The slack 632B corresponds to a difference between a time available for the data signals to arrive at the register 603, e.g., a time difference between the accelerate strobe 623 and the decelerate strobe 624, and the propagation delay 632A for the data signals through the logic 612.

In the third stage of the logic pipeline 600, the register 603 can be configured to latch data signals from the combinational logic 612 in response to the decelerate strobe 623 and allow the latched data signals to propagate through the logic 613 to the register 604. On a rising edge of the clock signal 622, the register 604 can latch data signals received from the logic 613. The data path timing for the propagation of the latched data signals to through the logic 613 to the register 604 includes a propagation delay 633A and slack 633B. The propagation delay 633A corresponds to a time for the data signals to traverse through the logic 613 and arrive at the register 604. The slack 633B corresponds to a difference between a time available for the data signals to arrive at the register 604, e.g., a time difference between the decelerate strobe 624 and the rising edge of the clock signal 622, and the propagation delay 633A for the data signals.

FIGS. 6C and 6D illustrate example timing diagrams 640 and 650 showing recycled slack recovered via strobes shown in FIG. 6A. Referring to FIGS. 6A and 6C, the timing diagram 640 shows utilization of recovered slack to adjust a frequency of the clock signal 621 in FIG. 6B into the adjusted clock signal 641. In other words, the recovered slack in the first and third stages of the logic pipeline 600 due to the accelerate strobe 623 and the decelerate strobe 642, respectively, can be utilized to increase the frequency of the clock signal 621 into the adjusted clock signal 641.

The timing diagram 640 shows data path timing for the first stage of the logic pipeline 600 receiving the adjusted clock signal 641, the accelerate strobe 623, and the decelerate strobe 642. The data path timing for the propagation of the data signals 621 in the first stage through the logic 611 to the register 602 includes a propagation delay 631A and slack 631B. The propagation delay 631A corresponds to a time for the data signals 621 to traverse through the logic 611 and arrive at the register 602. The slack 631B corresponds to a difference between a time available for the data signals 621 to arrive at the register 602, e.g., a time between a rising edge of the adjusted clock signal 641 and the accelerate strobe 623, and the propagation delay 631A for the data signals 621 through the logic 611.

The timing diagram 640 also shows data path timing for the second stage of the logic pipeline 600 receiving the adjusted clock signal 641, the accelerate strobe 623, and the decelerate strobe 642. The data path timing for the propagation of the latched data signals to through the logic 612 to the register 603 includes a propagation delay 632A and slack 634B. The propagation delay 632A corresponds to a time for the data signals to traverse through the logic 612 and arrive at the register 603. The slack 634B corresponds to a difference between a time available for the data signals to arrive at the register 603, e.g., a time difference between the accelerate strobe 623 and the decelerate strobe 642, and the propagation delay 632A for the data signals through the logic 612.

The timing diagram 640 also shows data path timing for the third stage of the logic pipeline 600 receiving the adjusted clock signal 641, the accelerate strobe 623, and the decelerate strobe 642. The data path timing for the propagation of the latched data signals to through the logic 613 to the register 604 includes a propagation delay 633A and slack 633B. The propagation delay 633A corresponds to a time for the data signals to traverse through the logic 613 and arrive at the register 604. The slack 633B corresponds to a difference between a time available for the data signals to arrive at the register 604, e.g., a time difference between the decelerate strobe 642 and a rising edge of the adjusted clock signal 641, and the propagation delay 633A for the data signals through the logic 613.

Referring to FIGS. 6A and 6D, the timing diagram 650 shows utilization of recovered slack to increase a time available for data propagation in the second stage of the logic pipeline 600. The recovered slack in the first and third stages of the logic pipeline 600 due to the accelerate strobe 623 and the decelerate strobe 624, respectively, can increase time available for data propagation in the second stage of the logic pipeline 600.

When a compiler generates a configuration for configurable hardware to implement the logic pipeline 600, the increased time available for data propagation in the second stage of the logic pipeline 600 can relax design constraints the compiler utilizes during the generation of the configuration. The relaxing of the design constraints can provide the compiler increased flexibility in generating the configuration, which can speed up the compilation process.

The timing diagram 650 is similar to the timing diagram 630 except for the second stage of the logic pipeline 600. The timing diagram 650 shows data path timing for the second stage of the logic pipeline 600, which includes propagation of the latched data signals to through the logic 612 to the register 603. The second stage includes a propagation delay 635A corresponding to an increased time for the data signals to traverse through the logic 612 and arrive at the register 603. The slack 635B corresponds to a difference between a time available for the data signals to arrive at the register 603, e.g., a time difference between the accelerate strobe 623 and the decelerate strobe 624, and the propagation delay 635A for the data signals through the logic 612.

Figure 7A:
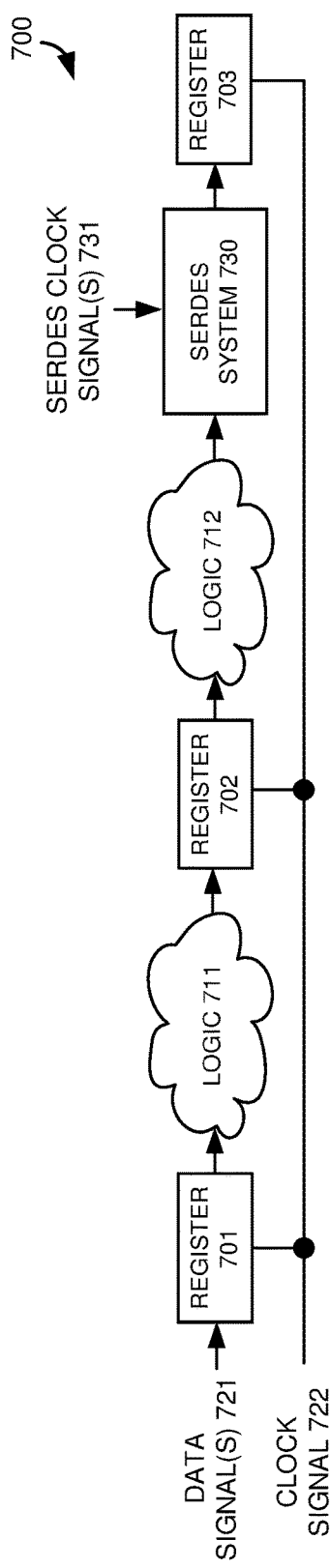
FIGS. 7A and 7B illustrate an example logic pipeline with a serializer/deserializer (SERDES) system and associated timing diagram that may be implemented according to various embodiments.
Figure 7B:
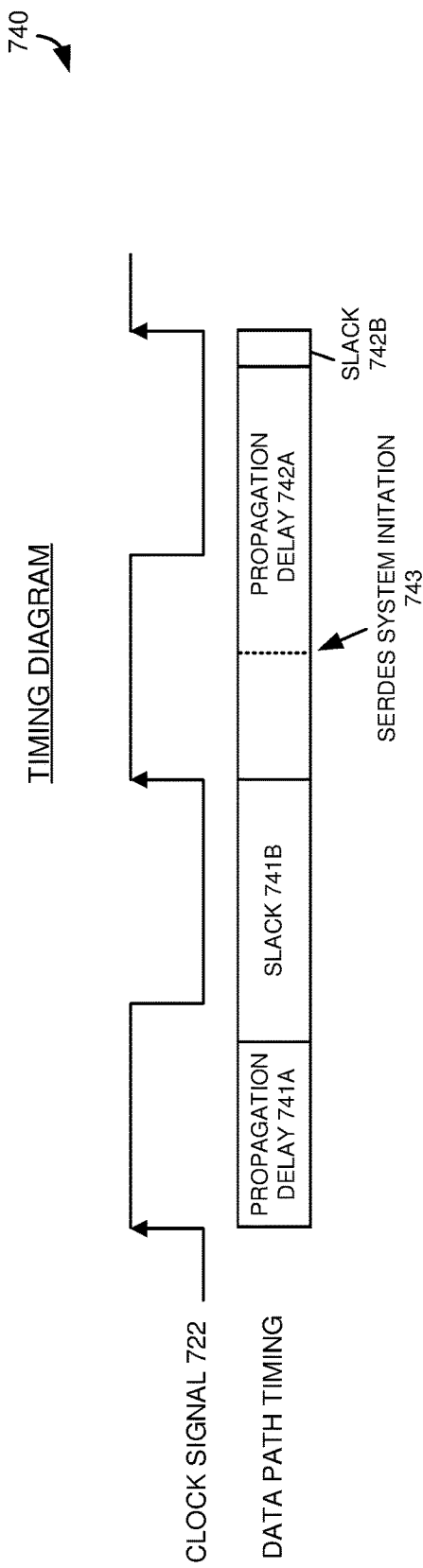

FIGS. 7A and 7B illustrate an example logic pipeline 700 with a serializer/deserializer (SERDES) system 730 and associated timing diagram 740 that may be implemented according to various embodiments. Referring to FIGS. 7A and 7B, the logic pipeline 700 includes multiple stages, each having combinational logic, such as logic 711 and 712, coupled between clock-driven circuitry, such as registers 701-703. In a first stage of the logic pipeline 700, the register 701 can be configured to latch data signals 721 in response to a rising edge of the clock signal 722 and allow the data signals 721 to propagate through the logic 711 to the register 702. The data path timing for the propagation of the data signals 721 to through the logic 711 to the register 702 includes a propagation delay 741A and slack 741B. The propagation delay 741A corresponds to a time for the data signals 721 to traverse through the logic 711 and arrive at the register 702. The slack 741B corresponds to a difference between a time available for the data signals 721 to arrive at the register 702 and the propagation delay 741A for the data signals 721.

In a second stage of the logic pipeline 700, the register 702 can be configured to latch data signals 721 from the logic 711 in response to a rising edge of the clock signal 722 and allow the latched data signals to propagate through the logic 712 towards the register 703. The second stage of the logic pipeline 700 also can include a SERDES system 730 to transfer signals output from the logic 712 to the register 703. In some embodiments, the SERDES system 730 can be included in the logic pipeline 700 to allow the second stage to span across partitions in configurable hardware. For example, when the registers 701 and 702 and the logic 711 and 712 reside on one configurable hardware device and the register 703 resides on another configurable hardware device, the SERDES system 730 can provide an interface for enable data transfers between the configurable hardware devices.

In some embodiments, the SERDES system 730 can be included in the logic pipeline 700 when a number of data signals output from the logic 712 exceeds a bandwidth of the communication interface between the logic 712 and the register 703. The SERDES system 730 can include serializer circuitry receive parallel data signals from the logic 712, convert them into a serialized format for transmission to deserializer circuitry in the SERDES system 730. The deserializer circuitry can convert the serialized data signals into a parallel format and output them to the register 703. The serializer circuitry and the deserializer circuitry can perform the serialization and deserialization operations in response to a SERDES clock signal 731.

On the next rising edge of the clock signal 722, the register 703 can latch data signals transferred through the logic 712 and the SERDES system 730. The data path timing for the propagation of the latched data signals to through the logic 712 and the SERDES system 730 to the register 703 includes a propagation delay 742A and slack 742B. The propagation delay 742A corresponds to a time for the data signals to traverse through the logic 712 and the SERDES system 730 and arrive at the register 703. The slack 742B corresponds to a difference between a time available for the data signals to arrive at the register 703 and the propagation delay 742A for the data signals. The timing diagram 740 also shows a SERDES system initiation 743, which illustrates when the SERDES system 730 can initiate transfer data signals from the logic 712 towards the register 703.

FIGS. 8A and 8B illustrate an example dual edge activation for a logic pipeline 800 with a serializer/deserializer (SERDES) system 830 and associated timing diagram 840 that may be implemented according to various embodiments. Referring to FIGS. 8A and 8B, the dual edge activation for a logic pipeline 800 can be similar to the logic pipeline 700 in FIG. 7 except the logic pipeline 800 was configured to recover slack from a first stage of the logic pipeline 800, which was recycled into the second stage to ease the pipeline bottleneck associated with the inclusion of the SERDES system 830 in the logic pipeline 800.

The logic pipeline 800 includes multiple stages, each having combinational logic, such as logic 811 and 812, coupled between clock-driven circuitry, such as registers 801-803. In a first stage of the logic pipeline 800, the register 801 can be configured to latch data signals 821 in response to a rising edge of the clock signal 822 and allow the data signals 821 to propagate through the logic 811 to the register 802. The data path timing for the propagation of the data signals 821 to through the logic 811 to the register 802 includes a propagation delay 841A and slack 841B. The propagation delay 841A corresponds to a time for the data signals 821 to traverse through the logic 811 and arrive at the register 802. The slack 841B corresponds to a difference between a time available for the data signals 821 to arrive at the register 802 and the propagation delay 841A for the data signals 821.

In a second stage of the logic pipeline 800, the register 802 can be configured to latch data signals 821 from the logic 811 in response to a falling edge of the clock signal 822 and allow the latched data signals to propagate through the logic 812 towards the register 803. Since the register 802 latches the data signals 821 on the falling edge of the clock signal 822, the logic pipeline 800 can recover slack from the first stage of the logic pipeline 800 compared to logic pipeline 700 in FIG. 7.

The second stage of the logic pipeline 800 also can include a SERDES system 830 to transfer signals output from the logic 812 to the register 803. In some embodiments, the SERDES system 830 can be included in the logic pipeline 800 to allow the second stage to span across partitions in configurable hardware. For example, when the registers 801 and 802 and the logic 811 and 812 reside on one programmable logic device and the register 803 resides on another programmable logic device, the SERDES system 830 can provide an interface for enable data transfers between the programmable logic devices.

In some embodiments, the SERDES system 830 can be included in the logic pipeline 800 when a number of data signals output from the logic 812 exceeds a bandwidth of the communication interface between the logic 812 and the register 803. The SERDES system 830 can include serializer circuitry receive parallel data signals from the logic 812, convert them into a serialized format for transmission to deserializer circuitry in the SERDES system 830. The deserializer circuitry can convert the serialized data signals into a parallel format and output them to the register 803. The serializer circuitry and the deserializer circuitry can perform the serialization and deserialization operations in response to a SERDES clock signal 831.

By recovering slack from the first stage in the logic pipeline 800, the second stage can receive additional time to propagate data signals through the logic 812 and the SERDES system 830. In some embodiments, the additional time can allow a compiler generating the configuration of the logic pipeline for implementation in configurable hardware to include more parallel data signals in the second stage, add combinational logic to the second stage, more closely align the SERDES clock signal 831 to when the logic 812 outputs data signals, allow the SERDES system 830 to initiate data transfer operations earlier, or the like.

On the next rising edge of the clock signal 822, the register 803 can latch data signals transferred through the logic 812 and the SERDES system 830. The data path timing for the propagation of the latched data signals to through the logic 812 and the SERDES system 830 to the register 803 includes a propagation delay 842A and slack 842B. The propagation delay 842A corresponds to a time for the data signals to traverse through the logic 812 and the SERDES system 830 and arrive at the register 803. The slack 842B corresponds to a difference between a time available for the data signals to arrive at the register 803 and the propagation delay 842A for the data signals. The timing diagram 840 also shows a SERDES system initiation 843, which illustrates when the SERDES system 830 can initiate transfer data signals from the logic 812 towards the register 803.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims. For example, while some of the specific terminology has been employed above to refer to electronic design automation processes, it should be appreciated that various examples of the invention may be implemented using any electronic system.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
utilizing, by a computing system, a physical specification of a verification system to identify partitions of configurable hardware in the verification system;
identifying, by the computing system, a stage of a logic pipeline described in a circuit design that, when implemented in the verification system, spans between a plurality of the partitions of the configurable hardware; and
modifying, by the computing system, the circuit design to alter a timing for logic operations in the logic pipeline based, at least in part, on the identified partitions of the configurable hardware, which reduces slack in at least one stage in the logic pipeline adjacent to the identified stage in the logic pipeline, wherein the configurable hardware, when configured with the modified circuit design, implements the logic pipeline with the altered timing.

2. The method of claim 1, further comprising generating, by the computing system, a configuration for the configurable hardware, which implements the logic pipeline with the altered timing in the configurable hardware.

3. The method of claim 1, wherein the alteration of the timing for logic operations in the logic pipeline increases a time available in the identified stage in the logic pipeline to perform the logic operations.

4. The method of claim 1, wherein the alteration of the timing for the logic operations in the logic pipeline further comprises utilizing the slack reduced from at least one of the stages adjacent to the identified stage to increase a clock frequency in the configurable hardware.

5. The method of claim 1, wherein the alteration of the timing for the logic operations in the logic pipeline further comprises utilizing the slack reduced from at least one of the stages adjacent to the identified stage to increase a time available for propagation delay associated with the identified stage.

6. The method of claim 1, wherein the alteration of the timing for the initiation of the logic operations in the logic pipeline further comprises replacing a clock signal received by the identified stage with an acceleration strobe, which advances initiation of the logic operations in the identified stage.

7. The method of claim 1, wherein the alteration of the timing the timing for the initiation of the logic operations in the logic pipeline further comprises replacing a clock signal received by a stage subsequent in the pipeline to the identified stage with a deceleration strobe, which delays initiation of the logic operations in the stage subsequent in the pipeline to the identified stage.

8. An apparatus comprising at least one computer-readable memory device storing instructions configured to cause one or more processing devices to perform operations comprising:
   utilizing a physical specification of a verification system to identify partitions of configurable hardware in the verification system;
   identifying a stage of a logic pipeline described in a circuit design that, when implemented in the verification system, spans between a plurality of the partitions of the configurable hardware; and
   modifying the circuit design to alter a timing for logic operations in the logic pipeline based, at least in part, on the identified partitions of the configurable hardware, which reduces slack in at least one stage in the logic pipeline adjacent to the identified stage in the logic pipeline, wherein the configurable hardware, when configured with the modified circuit design, implements the logic pipeline with the altered timing.

9. The apparatus of claim 8, wherein the instructions are configured to cause one or more processing devices to perform operations further comprising generating a configuration for the configurable hardware, which implements the logic pipeline with the altered timing in the configurable hardware.

10. The apparatus of claim 8, wherein the alteration of the timing for logic operations in the logic pipeline increases a time available in the identified stage in the logic pipeline to perform the logic operations.

11. The apparatus of claim 8, wherein the alteration of the timing for the logic operations in the logic pipeline further comprises utilizing the slack reduced from at least one of the stages adjacent to the identified stage to increase a clock frequency in the configurable hardware.

12. The apparatus of claim 8, wherein the alteration of the timing for the logic operations in the logic pipeline further comprises utilizing the slack reduced from at least one of the stages adjacent to the identified stage to increase a time available for propagation delay associated with the identified stage.

13. The apparatus of claim 8, wherein the alteration of the timing for the initiation of the logic operations in the logic pipeline further comprises replacing a clock signal received by the identified stage with an acceleration strobe, which advances initiation of the logic operations in the identified stage.

14. The apparatus of claim 8, wherein altering the timing for the initiation of the logic operations in the logic pipeline further comprises replacing a clock signal received by a stage subsequent in the pipeline to the identified stage with a deceleration strobe, which delays initiation of the logic operations in the stage subsequent in the pipeline to the identified stage.

15. A system comprising:
   a memory system configured to store computer-executable instructions; and
   a computing system, in response to execution of the computer-executable instructions, is configured to:
      utilize a physical specification of a verification system to identify partitions of configurable hardware in the verification system;
      identify a stage of a logic pipeline described in a circuit design that, when implemented in the verification system, spans between a plurality of the partitions of the configurable hardware; and
      modify the circuit design to alter a timing for logic operations in the logic pipeline based, at least in part, on the identified partitions of the configurable hardware, which reduces slack in at least one stage in the logic pipeline adjacent to the identified stage in the logic pipeline, wherein the configurable hardware, when configured with the modified circuit design, implements the logic pipeline with the altered timing.

16. The system of claim 15, wherein the computing system, in response to execution of the computer-executable instructions, is further configured to generate a configuration for the configurable hardware that implements the logic pipeline with the altered timing in the configurable hardware.

17. The system of claim 15, wherein the computing system, in response to execution of the computer-executable instructions, is further configured to utilize the slack reduced from at least one of the stages adjacent to the identified stage to increase a clock frequency in the configurable hardware.

18. The system of claim 15, wherein the computing system, in response to execution of the computer-executable instructions, is further configured to utilize the slack reduced from at least one of the stages adjacent to the identified stage to increase a time available for propagation delay associated with the identified stage.

19. The system of claim 15, wherein the computing system, in response to execution of the computer-executable instructions, is further configured to replace a clock signal received by the identified stage with an acceleration strobe, which advances initiation of the logic operations in the identified stage.

20. The system of claim 15, wherein the computing system, in response to execution of the computer-executable instructions, is further configured to replace a clock signal received by a stage subsequent in the pipeline to the identified stage with a deceleration strobe, which delays initiation of the logic operations in the stage subsequent in the pipeline to the identified stage.

* * * * *